United States Patent [19]
Chareire

[11] Patent Number: 5,291,973
[45] Date of Patent: Mar. 8, 1994

[54] DISK BRAKE FOR A WHEEL
[75] Inventor: Jean-Louis Chareire, Levallois Perret, France
[73] Assignee: Societe Anonyme dite: Aerospatiale Socitet Nationale Industrielle ayant son siege social, France
[21] Appl. No.: 864,566
[22] Filed: Apr. 7, 1992
[30] Foreign Application Priority Data
    Apr. 19, 1991 [FR] France .................... 9104850
[51] Int. Cl.5 .................... F16D 55/40; B60T 17/10
[52] U.S. Cl. .................... 188/71.5; 188/106 P; 303/2
[58] Field of Search .............. 188/71.5, 72.5, 18 A, 188/26, 106 P, 218 XL, 369, 370; 303/2, 5, 6.01, 9.61, 9.62, 9.71–9.75

[56] References Cited
U.S. PATENT DOCUMENTS

| | | | |
|---|---|---|---|
| 3,487,894 | 1/1970 | Szigeti | 188/106 P X |
| 3,951,240 | 4/1976 | Dowell et al. | 188/71.5 |
| 4,702,529 | 10/1987 | Tobiasz | 303/9.62 |
| 5,046,590 | 9/1991 | Trema | 188/71.5 X |
| 5,168,963 | 12/1992 | Poncini | 188/72.5 |

FOREIGN PATENT DOCUMENTS

| | | |
|---|---|---|
| 0260412 | 3/1988 | European Pat. Off. . |
| 0296667 | 12/1988 | European Pat. Off. . |
| 1800549 | 5/1970 | Fed. Rep. of Germany ..... 188/72.5 |
| 2231915 | 1/1973 | Fed. Rep. of Germany ..... 188/72.5 |
| 2745283 | 4/1979 | Fed. Rep. of Germany ... 188/106 P |
| 4034224 | 2/1992 | Japan .................... 188/71.5 |
| 2197924 | 6/1988 | United Kingdom .......... 188/71.5 |

OTHER PUBLICATIONS

Patent Abstracts of Japan, vol. 9, No. 213 (M-408) (1936), Aug. 30, 1985, 60-73134.

Primary Examiner—Robert J. Oberleitner
Assistant Examiner—Alfred Muratori
Attorney, Agent, or Firm—Marshall, O'Toole, Gerstein, Murray & Borun

[57] ABSTRACT

A wheel brake includes at least two brake disks; a brake fluid feed for feeding brake fluid under pressure; and a pressure system connected to the brake fluid feed and acting on the disk brakes. At least one of the brake disks is made of metal, while at least one other of the disks is made of carbon. The pressure system includes actuators respectively associated with the metal disk and with the carbon disk and fed with brake fluid via respective parallel connections; and also a pressure interruption system responsive to the action of the pressure of the brake fluid to take the actuator associated with the metal disk out of communication with the brake fluid feed when the fluid pressure exceeds a predetermined value.

10 Claims, 2 Drawing Sheets

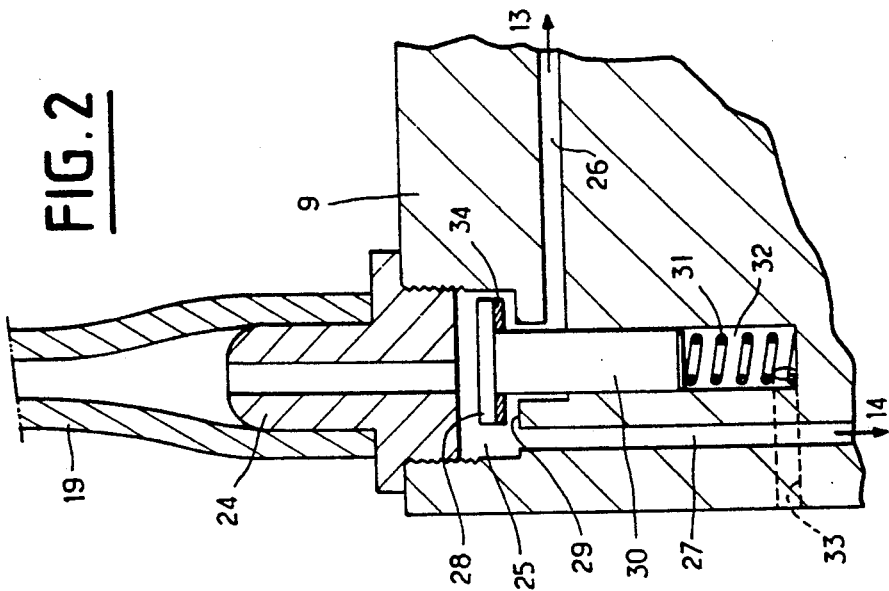

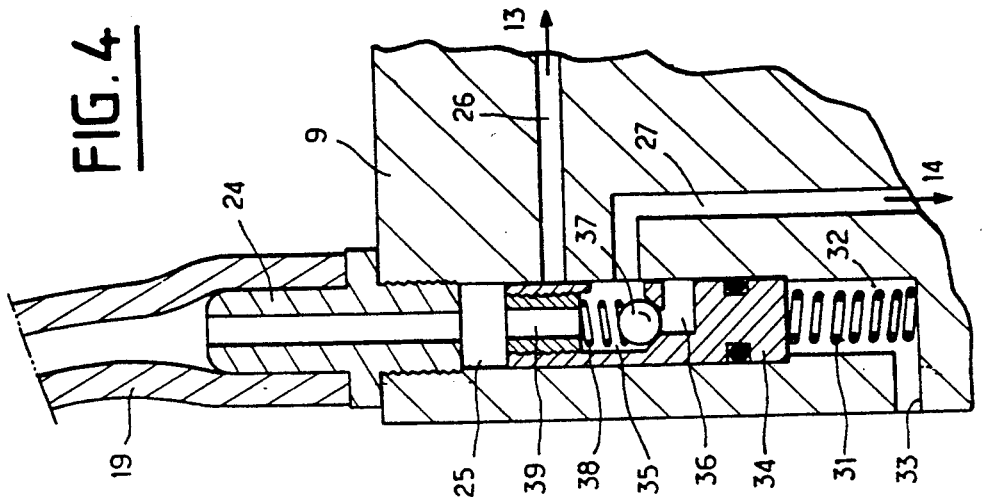
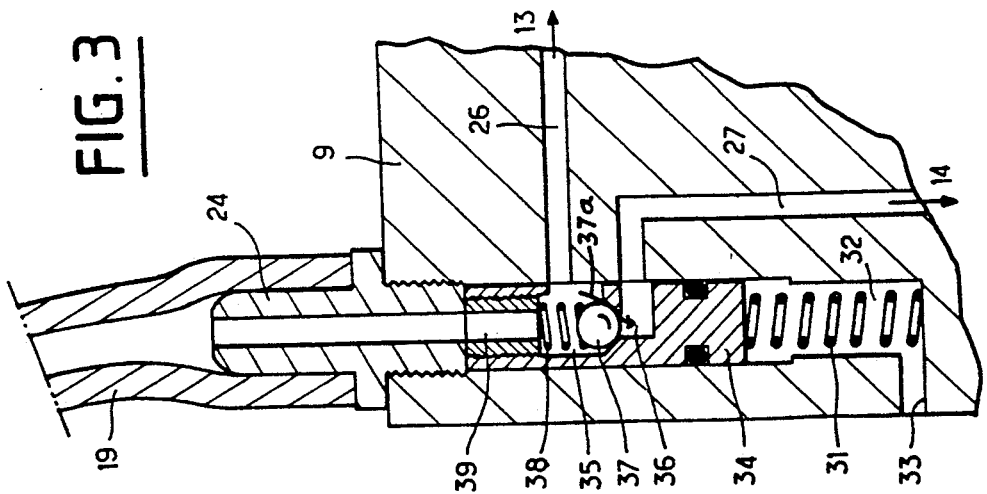

DISK BRAKE FOR A WHEEL

The present invention relates to a disk brake for a wheel. The brake of the present invention is particularly, but not exclusively, suitable for use in braking the wheels of heavy road trucks.

BACKGROUND OF THE INVENTION

It is known that a disk brake for a wheel comprises one or more disks constrained to rotate with the wheel, together with an actuator capable of applying axial pressure on the disks to brake the wheel. Generally, when the brake includes a plurality of disks, at least some of them, while remaining constrained to rotate with the wheel, are nevertheless mounted so as to be capable of sliding parallel to the axis of said wheel.

Essentially two types of disk brake are known that differ with respect to raw material, namely brakes with metal disks and brakes with carbon disks.

In brakes with metal disks, the said disks are made of steel, cast iron, copper, etc. . . . , and an actuator presses brake linings against said disks which brake linings may be made, for example, of asbestos fiber and phenol resin, a vitrified compound, a ceramic-metal compound, etc. In brakes having carbon disks, the said brake linings are likewise made of carbon.

Each of these two types of disk brake has its own advantages and drawbacks.

With brakes having metal disks, wear performance is good at low power per $cm^2$, and the cost of brake lining material is low. In contrast:

wear performance falls off rapidly when braking at high power per $cm^2$; and energy storage for given mass is low because of the specific heat and the poor refractory nature of the material used for the linings and for the disks.

In brakes having disks and linings made of carbon: at low power per $cm^2$, wear performance is of the same order as that of the linings in brakes having metal disks;

at high power per $cm^2$, wear performance is considerably better than that of the linings in brakes having metal disks; and energy storage for given mass is high because of the refractory nature and the high specific heat of carbon.

In contrast, the cost of carbon is high, and as a result each braking operation is expensive.

An object of the present invention is to remedy the above drawbacks and to provide a disk brake having the advantages both of brakes having metal disks and of brakes having carbon disks, but without their drawbacks.

SUMMARY OF THE INVENTION

To this end, the wheel brake of the present invention comprising:

at least two brake disks;

a brake fluid feed for feeding brake fluid under pressure; and a pressure system connected to said brake fluid feed and acting on said brake disks;

is remarkable:

in that at least one of said brake disks is made of metal, while at least one other one of said disks is made of carbon;

in that said pressure system comprises first and second actuators, said actuators being associated respectively with said metal disk and with said carbon disk, the pistons of said actuators being capable of being subjected to the action of respective resilient return means tending to move said pistons away from said disks;

in that said first and second actuators are fed with brake fluid from said feed via respective parallel connections; and in that interruption means responsive to the action of the pressure of said brake fluid are disposed on the connection connecting said feed to said first actuator associated with said metal disks to allow communication between said first actuator and said feed only when the pressure of said brake fluid is below a limit pressure threshold.

Thus, by an appropriate choice of said predetermined pressure threshold, the wheel brake of the invention:

performs the most frequent braking operations (low energy and low power) using the metal disks which provides good performance and is cheap, while the carbon disk is not actuated since using the carbon disk under such braking conditions would be expensive; and performs less frequent braking operations (high energy and high power) using the carbon disk, such that use thereof is rare and consequently cheap enough, with the metal disk then being actuated up to a limit pressure, which avoids destroying the associated brake linings.

It can thus be seen that the brake of the present invention implements a combined braking technique (using a metal disk and a carbon disk), thereby making it possible to use both the linings for the metal disk and the carbon linings to their best effect, given that said different kinds of lining provide optimum performance under different operating conditions. The combined braking technique of the invention is advantageous simultaneously with respect to cost, to mass or bulk, and to managing braking energy and power. It is therefore particularly suitable for heavy road trucks for which a commercial increase in speed depends closely on the braking capacity of their brakes.

In a particularly simple embodiment of the present invention, said interruption means are constituted by a valve or the like loaded by a spring tending to move said valve away from its seat.

Thus, when the brake fluid is applied to said valve, it remains open so long as said fluid exerts a force on said valve that is less than the opposing force applied by said return spring. As soon as the force due to the fluid pressure exceeds the force of the return spring, the valve closes, thereby taking the brake fluid feed out of communication with the actuator associated with the metal disk. Conversely, when the force exerted by the fluid pressure drops, and returns below the force of the return spring, said valve opens again.

The valve thus acts as a pressure limiter which interrupts the flow of brake fluid to the actuator associated with the metal disk whenever the braking pressure exceeds the rated value defined by said return spring.

This simple embodiment thus presents the following advantages:

the power that can be exerted per $cm^2$ on the linings associated with the metal disk is limited, thereby avoiding occasions on which said linings are subjected to very rapid wear;

each time the brake fluid pressure exceeds the limit pressure, the amount of energy stored in the metal disk compared with the amount stored in the carbon disk is limited. It may be observed, that to enhance preservation of the linings associated with the metal disk, and when only one of the disks is slidably mounted, it is advantageous for that disk to be the metal disk, thereby improving the rate at which heat is dumped into the wheel. However, that is not essential;

in the event of braking that continues for a very long time, it is not possible to subject a large thickness of the linings associated with the metal disk to thermal damage since any reduction in the thickness thereof automatically stops the actuator applying pressure while the pressure limiter is in operation. The pressure limiter limits pressure by interrupting the flow of brake fluid; and it becomes possible to use linings with the metal disk that have a coefficient of friction which falls off greatly with temperature, thereby reducing braking power (for given actuator pressure) on the linings and thus reducing their temperature rise. This very common feature of brake linings is easily obtained and is normally considered as being a defect. Simultaneously, the braking power received by the carbon brake increases to compensate.

Nevertheless, in this simple embodiment, it will be observed that the second actuator associated with the carbon disk is fed with brake fluid even when the fluid is at low pressure. Thus, to avoid brake utilization costs, it is advantageous for said resilient return means for the piston of said second actuator associated with said carbon disk are rated so that said piston of said second actuator is pressed against said carbon disk only from a pressure value of said brake fluid that is substantially equal to said limit pressure threshold.

In this way, the carbon disk and linings do not exert any braking action at low pressure and come into action only from the moment when the metal disk and the linings associated therewith become isolated from the feed of brake fluid under pressure by said interruption means.

In a more complete version of the wheel brake of the invention, said interruption means further include means allowing brake fluid under pressure to flow towards said second actuator associated with said carbon disk only when the pressure of said brake fluid is substantially equal to said limit pressure threshold.

Thus, the carbon linings cannot be brought into play below the limit pressure threshold, i.e. during low power braking which is provided solely by the linings associated with the metal disk.

Advantageously, in this variant embodiment, said interruption means include a non-return valve subjected to thrust from a weak spring and subjected in the closure direction to the action of the pressure of the brake fluid, the non-return valve closing a passage connecting the connection associated with said second actuator to said feed when the pressure is below the minimum value required for feeding the second actuator.

Thus, said non-return valve allows the circuit of said second actuator to be discharged under the action of the resilient return means associated with the piston of said actuator, when pressure conditions make that possible.

However, should the carbon linings be brought into play during high pressure braking, then they remain in action even when the pressure falls below the limit pressure, and for so long as the pressure exerts a force that is greater than that of said resilient return means. This aspect does not degrade carbon wear since said carbon linings wear essentially at the beginning of braking.

Compared with the first embodiment of the invention, this second embodiment has the following additional advantages:

infrequent use of the carbon disk, thereby providing good saving;

the carbon can be used for storing heat during a long descent down a shallow slope, thus requiring low braking power. This can be done merely by the driver of the vehicle including the brake observing that the downwards slope is long and increasing braking pressure for a short moment so as to bring the carbon brakes into play, which brakes then remain in action at low power and thereby contribute to storing energy together with the linings associated with the metal disk; and the same advantage as that described in the preceding subparagraph can be obtained without requiring the driver to take any special action, by providing said means for communicating with the said second actuator with a leak that is small but accurate (e.g. at said non-return valve) such that if low pressure braking continues for more than a certain length of time (e.g. 10 seconds to 20 seconds), then the carbon disk is automatically brought into play.

The above embodiment of the invention thus satisfies all of the conditions required for optimum braking using a system with different types of lining.

Under such circumstances, it is preferable for said interruption means to include a moving distributor valve member disposed inside a housing and connected firstly to said brake fluid feed and secondly to said connections associated with said first and second actuators. It is then advantageous for said passage and said associated non-return valve to be disposed inside said moving distributor valve member.

In the context of the invention, it is possible for both disks to be fixed relative to the wheel or for one of them to be slidable parallel to the axis thereof. In the first case, the two conventional calipers required for carrying the actuators must be capable of sliding independently of each other along an axis parallel to the axis of the wheel, in particular to compensate for wear.

In the second case, both actuator-carrying calipers can be combined in a single unit (thereby saving weight), which unit is likewise slidable along an axis parallel to the wheel axis. It is then most advantageous for said interruption means to be carried by said single caliper unit. Bulk is thus minimized and only one hose for conveying brake fluid under pressure needs to terminate at said single caliper unit.

BRIEF DESCRIPTION OF THE DRAWINGS

Embodiments of the invention are described by way of example with reference to the accompanying drawings, in which:

FIG. 1 is a diagram of one embodiment of a brake in accordance with the present invention.

FIG. 2 is a diagrammatic section through a first implementation of the feed for feeding hydraulic fluid under pressure to the brake of FIG. 1.

FIGS. 3 and 4 are diagrammatic sections of a second implementation of the feed for feeding hydraulic fluid under pressure to the brake of FIG. 1, this second implementation being shown respectively in a position corresponding to braking using the metal disk (FIG. 3)

and in a position corresponding to braking using the carbon disk (FIG. 4).

In the figures, identical references designate items that are similar.

DETAILED DESCRIPTION

The embodiment of a brake of the present invention that is shown diagrammatically in FIG. 1 includes a metal disk 1 (made of steel, cast iron, copper, etc.), and a carbon disk 2. The metal disk 1 is integral with the hub 3 of a wheel (not shown) about an axis X—X, whereas the carbon disk 2 is constrained to rotate with said hub 3, while being capable of sliding therealong, by virtue of conventional means comprising a set of axial splines 4 and grooves 5 carried by said hub 3 and co-operating respectively with notches 6 and teeth 7 distributed around the periphery of a central opening 8 in said carbon disk 2 and fitted on the hub 3. The axes of the disks 1 and 2 coincide with the axis X—X of the wheel.

The brake shown in FIG. 1 also includes a non-rotating caliper 9 mounted in a slideway (not shown) so as to be capable of sliding parallel to the wheel axis X—X (arrows f). Two open housings 10 and 11 separated by a partition 12 are formed in the caliper 9 and the peripheries of the disks 1 and 2 are received therein, respectively.

An actuator 13 is mounted in the caliper 9 on the side of the housing 10 opposite to the partition 12 and facing said partition. Similarly, an actuator 14 is mounted in the caliper 9 on the side of the housing 11 opposite to said partition 12, and facing said partition. The pistons 15 and 16 of the actuators 13 and 14 are associated with respective return springs 17 and 18. The actuators 13 and 14 are fed with hydraulic brake fluid via a flexible hose 19.

Brake linings 20 and 21 respectively carried by the piston 15 and by the partition 12 are providing facing the periphery of the metal disk 1 where it penetrates into the housing 10. By way of example, the brake linings 20 and 21 may be made of asbestos fiber and phenol resin, of a vitrified compound or of a ceramic-metal compound, or of any other conventional material used for co-operating with a metal brake disk. Similarly, carbon brake linings 22 and 23 respectively carried by the piston 16 and by the partition 12 are provided facing the periphery of the carbon disk 2 where it penetrates into the housing 11.

As can be seen in the embodiment of FIG. 2, the hose 19 opens out via an endpiece 24 into a chamber 25 formed in the caliper 9. The chamber 25 is connected to the actuators 13 and 14 via respective ducts 26 and 27. In addition, communication between the chamber 25 and the duct 26 is under the control of a valve whose head 28 is inside said chamber 25 and is suitable for co-operating with a seat 29. The rod 30 of said valve provides sliding guidance therefor. A spring 31 received in a chamber 32 connected to the atmosphere via a vent 33 tends to lift the valve head 28 off its seat 29. A sealing gasket 34 may be disposed on the face of the valve head 28 that faces the seat 29.

Thus, when a driver actuates the brake actuating member (not shown), e.g. a pedal, the pressure of the hydraulic fluid in the hose 19 is caused to increase in conventional manner. So long as the pressure of said hydraulic fluid is low enough to exert a force on the valve head 28 which is less than the force exerted thereon by the spring 31, the valve 28, 30 remains open and hydraulic fluid under pressure is applied to both actuators 13 and 14 via the respective ducts 26 and 27. Both actuator pistons 15 and 16 are thus actuated simultaneously and the wheel is braked by simultaneous action on both disks 1 and 2 (situation shown in FIG. 1).

As soon as the hydraulic fluid pressure reaches a limit threshold that is high enough for the force exerted thereby on the valve to be greater than the force exerted thereon by the spring 31, the valve 28 closes with the gasket 34 pressing against the seat 29. It can be seen that this limit threshold is determined by the spring 31. As from this moment, only the actuator 14 is fed with hydraulic fluid and all additional braking is the result solely of the action of said actuator 14 on the carbon disk 2. When the driver ceases to act on the brake actuator member, the hydraulic fluid pressure falls off and as a result the valve 28, 30 can open again under drive from its spring 31 as soon as the force exerted by the hydraulic fluid on said valve becomes less than the force exerted by the spring.

If it is desired that the carbon disk should not be brought into play at hydraulic fluid pressures below said threshold, approximately, then the spring 18 merely needs to be rated so that its force prevents the piston 16 being displaced until the hydraulic fluid pressure is substantially equal to said threshold.

In the variant embodiment of FIGS. 3 and 4, items 9, 19, 24, 25, 26, 27, 31, 32, and 33 of FIG. 2 can be seen. However, in this case, the chamber 25 is made in the form of a cylinder for a slide. A slide 34 is displaceable within the chamber 25 and replaces the valve 28, 30. The slide 34 is subjected to the action of the spring 31.

The slide 34 has two internal chambers 35 and 36 which open out to the periphery of said slide and which are separated from each other by a non-return valve 37 itself loaded by a weak spring disposed inside the chamber 35. A duct 39 inside the slide 34 provides communication between the chamber 35 and the hose 19.

The slide 34 can move between two extreme positions inside the chamber 25.

In the first of these extreme positions, as shown in FIG. 3, the spring 31 is at maximum extension and the chambers 35 and 36 are in communication with the ducts 26 and 27 respectively. In the second of said extreme positions (see FIG. 4), the spring 31 is at minimum extension with the duct 26 being closed by the slide 34 while the duct 27 is in communication with the chamber 35 while the chamber 36 is closed by the wall of the chamber 25.

Thus, when a driver actuates the brake actuator member (not shown), the hydraulic fluid pressure in the hose 19 is transmitted to the actuator 13 via the duct 39, the chamber 35, and the duct 26. So long as the fluid pressure exerts a force on the slide 34 that is less than the force exerted by the spring 31 (see FIG. 3), only the metal disk 1 is used in the braking process since the duct 27 is isolated from the chamber 35 by the non-return valve 37.

In contrast, if the pressure of the hydraulic fluid exceeds a limit threshold determined by the spring 31, then the slide 34 is pushed back by said fluid until the duct 26 is closed and the duct 27 is put into communication with the chamber 35 which receives hydraulic pressure via the duct 39 (see FIG. 4). Under such circumstances, only the carbon disk 2 is used for providing any increase in braking force, with the metal disk continuing to provide a substantially constant amount of torque.

If the brake actuator member is released, then the duct 27 is closed again (FIG. 3) and pressure is brought into equilibrium between the duct 27 and the chamber 35 via the non-return valve 37 which opens against the action of its spring 38.

Naturally, the axial length of the lateral opening of the chamber 35 facing the ducts 26 and 27 determines how smoothly the braking action of the carbon disk 2 is brought into effect relative to the limit being applied to the action of the metal disk 1.

It may also be observed that the brake shown in FIGS. 3 and 4 has the advantage of enabling the carbon disk 2 to be brought into play for long duration braking (i.e. involving a large amount of energy), even if the pressure required is low. Merely by applying a higher degree of braking for a very short period of time, it is possible thereafter to continue using the carbon brake at lower pressure so that it can participate in storing energy during a long descent. Under such circumstances, the pressure remains high inside the chamber 35 so the non-return valve 37 does not enable the duct 27 to discharge.

It is also possible, in application of the invention, to bring the carbon disk into play during long descents at a shallow slope without requiring pressure to be applied above the threshold set for the carbon disk, merely by providing a permanent through passage 37a of very small section, e.g. through the non-return valve 37.

In this way, the carbon disk is not brought into play by short duration braking as happens most often at a pressure below the relevant threshold, but it is automatically brought into play if a low level of braking continues for some length of time.

Naturally, regardless of the mechanical or thermal damage acquired by the disk or the linings, the stroke of each of the pistons 15 and 16 is limited by abutments (not shown) to ensure that the pistons cannot escape from their cylinders which would give rise to a severe loss of hydraulic fluid.

Thus, the brake of the invention increases the safety of wheel braking. Should the carbon brake linings 22 and 23 be lost, braking is still provided by the linings 20 and 21, and vice versa.

The dispositions described above are not limiting. A brake of the invention may include a plurality of metal disks and/or a plurality of carbon disks (actuated by actuators that act simultaneously on the materials of the same type), and the various different disks (carbon and metal) may be actuated by independent sliding calipers.

I claim:

1. A wheel brake for a wheel comprising:
   at least two brake disks;
   a brake fluid feed for feeding brake fluid under pressure; and
   a pressure system connected to said brake fluid feed and acting on said brake disks;
   wherein:
   at least one of said brake disks is made of metal, while at least one other of said disks is made of carbon;
   said pressure system comprises first and second actuators, each including a piston, said actuators being associated respectively with said metal disk and with said carbon disk, the pistons of said actuators being biased by respective resilient return means tending to move said pistons away from said disks;
   said first and second actuators are fed with brake fluid from said feed via respective parallel connections; and
   interruption means, responsive to the pressure of said brake fluid, are disposed between said feed and said first actuator to allow communication between said first actuator and said feed only when the pressure of said brake fluid is below a limit pressure threshold,
   said interruption means comprising a valve biased by a spring tending to move said valve away from a seat,
   said resilient return means for the piston of said second actuator being rated so that said piston of said second actuator is pressed against said carbon disk only when the pressure of said brake fluid substantially equals or exceeds said limit pressure threshold.

2. A wheel brake according to claim 1, wherein one of said brake disks is mounted to slide parallel to the axis of the wheel, and wherein said brake includes a single caliper unit at the periphery of said disks and likewise mounted to slide parallel to said wheel axis, said caliper unit carrying said first and second actuators.

3. A wheel brake according to claim 2, wherein said interruption means are carried by said single caliper unit.

4. A wheel brake comprising:
   at least two brake disks;
   a brake fluid feed for feeding brake fluid under pressure; and
   a pressure system connected to said brake fluid feed and actuating on said brake disks;
   wherein;
   at least one of said brake disks is made of metal, while at least one other of said disks is made of carbon;
   said pressure system comprises first and second actuators, each including a piston, said actuators being associated respectively with said metal disk and with said carbon disk, the pistons of said actuators being biased by respective resilient return means tending to move said pistons away from said disks;
   said first and second actuators are fed with brake fluid from said feed via respective parallel connections; and
   interruption means responsive to the pressure of said brake fluid are disposed between said feed to said first actuator to allow communication between said first actuator and said feed only when the pressure of said brake fluid is below a limit pressure threshold,
   said interruption means allowing brake fluid under pressure to flow towards said second actuator only when the pressure of said brake fluid is substantially equal to said limit pressure threshold, said interruption means further including a leakage path of very small section for allowing brake fluid to flow to the second actuator, thus energizing said second actuator if braking continues for a length of time exceeding a predetermined value.

5. A wheel brake according to claim 4 wherein said interruption means including a nonreturn valve subjected to thrust from a weak spring and subjected in the closure direction to the action of the pressure of the brake fluid, the nonreturn valve closing a passage connecting said second actuator to said feed when the pressure is below said limit pressure threshold.

6. A wheel brake according to claim 4, wherein said interruption means include a moving distributor valve member disposed inside a housing and connected firstly to said brake fluid feed and secondly to said connections associated with said first and second actuators.

7. A wheel brake according to claim 6, wherein said non-return valve is disposed inside said moving distributor valve member.

8. A wheel brake according to claim 6 wherein said leakage path is disposed inside said moving distribution valve member.

9. A wheel brake according to claim 4, wherein one of said brake disks is mounted to slide parallel to the axis of the wheel, and wherein said brake includes a single caliper unit at the periphery of said disks and likewise mounted to slide parallel to said wheel axis, said caliper unit carrying said first and second actuators.

10. A wheel brake according to claim 9, wherein said interruption means are carried by said single caliper unit.

* * * * *